United States Patent Office 3,636,108
Patented Jan. 18, 1972

3,636,108
CATALYTIC HYDROGENATION OF AROMATIC NITROGEN CONTAINING COMPOUNDS OVER ALKALI MODERATED RUTHENIUM
Loren D. Brake, Wilmington, Del., assignor to E. I. du Pont de Nemours and Company, Wilmington, Del.
No Drawing. Continuation-in-part of application Ser. No. 691,933, Dec. 20, 1967, which is a continuation-in-part of application Ser. No. 587,981, Oct. 20, 1966, which in turn is a continuation-in-part of application Ser. No. 516,083, Dec. 23, 1965. This application is also a continuation-in-part of application Ser. No. 587,981, Oct. 20, 1966, which is a continuation-in-part of application Ser. No. 516,083, Dec. 23, 1965. This application is also a continuation-in-part of application Ser. No. 691,980, Dec. 20, 1967, which is a continuation-in-part of application Ser. No. 587,989, Oct. 20, 1966, which in turn is a continuation-in-part of application Ser. No. 516,093, Dec. 23, 1965. This application is also a continuation-in-part of application Ser. No. 587,989, Oct. 20, 1966, which is a continuation-in-part of application Ser. No. 516,093, Dec. 23, 1965. This application Apr. 4, 1969, Ser. No. 813,753
Int. Cl. C07c 85/14
U.S. Cl. 260—563 D
22 Claims

ABSTRACT OF THE DISCLOSURE

Organic aromatic nitrogen containing compounds, such as p-phenylenediamine or 4,4'-methylenedianiline, can be hydrogenated by admixing the compound with hydrogen at a hydrogen partial pressure of at least 200 p.s.i., a total pressure of from 200 p.s.i. to 15,000 p.s.i., a temperature in the range of from 100° C. to 300° C., in the presence of from 0% to 200% by weight, based on the weight of the compound to be hydrogenated, of added ammonia, and in the presence of from 0.001% to 10% by weight, based on the compound to be hydrogenated and calculated as metallic ruthenium of a ruthenium catalyst supported on an inert carrier, said catalyst being alkali moderated with from 0.1% to 15% of a basic metal compound calculated as the alkali metal.

CROSS REFERENCES TO OTHER APPLICATIONS

This application is a continuation-in-part of Ser. No. 691,933, filed Dec. 20, 1967, now abandoned, which is in turn a continuation-in-part of Ser. No. 587,981, filed Oct. 20, 1966, now abandoned, which is in turn a continuation-in-part of Ser. No. 516,083, filed Dec. 23, 1965, now abandoned.

This application is also a continuation-in-part of Ser. No. 587,981, filed Oct. 20, 1966, now abandoned, which is in turn a continuation-in-part of Ser. No. 516,083, filed Dec. 23, 1965, now abandoned.

This application is a continuation-in-part of Ser. No. 691,980, filed Dec. 20, 1967, now abandoned, which is in turn a continuation-in-part of Ser. No. 587,989, filed Oct. 20, 1966, now abandoned, which is in turn a continuation-in-part of Ser. No. 516,093, filed Dec. 23, 1965, now abandoned.

This application is also a continuation-in-part of Ser. No. 587,989, filed Oct. 20, 1966, now abandoned, which is in turn a continuation-in-part of Ser. No. 516,093, filed Dec. 23, 1965, now abandoned.

BACKGROUND OF THE INVENTION

This invention relates to a method of hydrogenating aromatic nitrogen containing compounds by heating the compound in the presence of hydrogen, the presence or absence of added ammonia, and the presence of an alkali moderated supported ruthenium catalyst. By this method the aromatic compound is converted to the corresponding saturated compound.

Various methods are known in the art for hydrogenating aromatic nitrogen containing compounds such as those disclosed in the following U.S. patents:

2,606,925 to Whitman
2,606,926 to Kirby
2,606,928 to Barkdoll et al.
2,822,392 to Illich et al.

While the processes in the above mentioned references have worked in the past, they tend to be unsatisfactory because of low yields and the production of by-product tars and condensation or deamination products produced when amine groups are split off during hydrogenation or as in the case of U.S. Pat. 3,347,917 to Arthur, they require the use of ammonia to obtain a good yield. The use of ammonia is more costly because it requires special facilities for adding and recovery of the ammonia.

This invention also relates to a method for hydrogenating 4,4'-methylenedianiline, hereinafter referred to as MDA, by heating it under hydrogen pressure in the presence of an alkali moderated ruthenium catalyst. By this method the corresponding 4,4'-methylenedi(cyclohexylamine) is obtained in good yield with very little contamination from by-product tars and condensation or deamination products.

The various methods known to the art for preparing 4,4'-methylenedi(cyclohexylamine), hereinafter referred to as PACM, produce a variety of mixtures of the three steroisomeric forms, commonly referred to as the cis,cis-, cis,trans- and trans,trans-stereoisomers.

PACM can be used for the preparation of polyamides by reacting it with a polycarboxylic acid such as sebacic acid. The stereoisomeric composition of the PACM used will determine some of the properties of the polyamide to be formed. To obtain a polyamide with properties derived from the trans,trans-isomer of PACM it is necessary to have as a starting material a PACM composition of high trans,trans-isomer content.

The processes previously described have the limitation that when long reaction times are used, decomposition products such as tars are increased and catalyst life is markedly reduced. Under the hydrogenation conditions of this invention, decomposition and condensation by-products (tars) are minimized and conversion to the desired products is markedly improved.

A process has been discovered for saturating aromatic nitrogen containing compounds, particularly MDA. The process is characterized by the formation of very little tars, decomposition products, or condensation products. The process can be run repeatedly or continuously for extended periods, with good yields of desired product without catalyst rejuvenation.

SUMMARY OF THE INVENTION

This invention is directed to a process for hydrogenating aromatic nitrogen containing compounds having the following formulae:

(I) 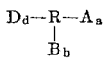

(II) 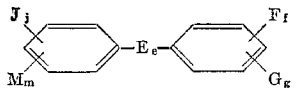

(III) 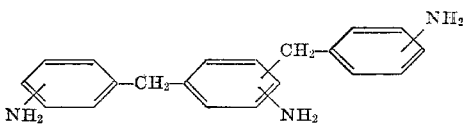

(IV) 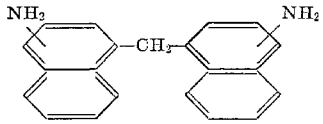

and (V) 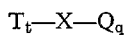

wherein

R is benzene, naphthalene, anthracene, or fluorene;
X is pyridine, quinoline, or indole;
A is

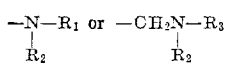

B is —$NH_2$, alkyl having 1 to 12 carbon atoms, or alkoxy having 1 to 5 carbon atoms;
D is alkyl having 1 to 12 carbon atoms, —$NH_2$, alkoxy having 1 to 5 carbon atoms, —OH, or cyano;
E is —$CH_2$—, —$CH_2CH_2$—, or —O—;
F is

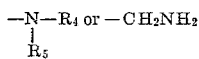

G is —$NH_2$ or alkyl having 1 to 12 carbon atoms;
J is

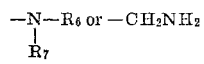

M is —$NH_2$ or alkyl having 1 to 12 carbon atoms;
Q is —$NH_2$ or alkyl having 1 to 12 carbon atoms;
T is —$NH_2$ or alkyl having 1 to 12 carbon atoms;
$R_1$ is hydrogen or alkyl having 1 to 12 carbon atoms;
$R_2$ is hydrogen, alkyl having 1 to 12 carbon atoms, benzyl, cyclohexyl, or phenyl;
$R_3$ is hydrogen or alkyl having 1 to 12 carbon atoms;
$R_4$, $R_5$, $R_6$ and $R_7$ are the same or different and are selected from hydrogen or alkyl having 1 to 12 carbon atoms;
$a$ is an integer selected from 1 or 2, with the proviso that when $a$ is 2, the A groups may be the same or different;
$b$, $d$, $e$, $f$, $g$, $j$, $m$, $q$, and $t$ are the same or different and are integers selected from 0 to 1 with the proviso that at least one of $f$, $g$, $j$ or $m$ is 1;

with the provisos that:

(1) compounds having Formulae I and V can contain no more than 30 carbon atoms and
(2) compounds having Formula II can contain no more than 36 carbon atoms;

comprising admixing said compound with hydrogen at a hydrogen partial pressure of at least 200 p.s.i., a total pressure of from 200 p.s.i. to 15,000 p.s.i., a temperature in the range of from 100° C. to 300° C., in the presence of from 0% to 200%, by weight, based on the weight of said compound to be hydrogenated, of added ammonia, and in the presence of from 0.001% to 10% by weight, based on said compound to be hydrogenated and calculated as metallic ruthenium, of a ruthenium catalyst supported on an inert carrier, said catalyst being alkali moderated with from 0.1% to 15% of a basic metal compound calculated as the alkali metal.

The preferred group of aromatic nitrogen containing compounds are those having the formulae:

(VI) 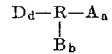

(VII) 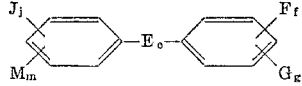

(VIII) 

and (IX) 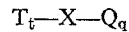

wherein:

R is benzene, naphthalene, anthracene, or fluorene;
X is pyridine, quinoline, or indole;
A is —$NH_2$ or —$CH_2NH_2$;
B is —$NH_2$, alkyl having 1 to 12 carbon atoms, or alkoxy having 1–5 carbon atoms;
D is alkyl having 1–12 carbon atoms or alkoxy having 1–5 carbon atoms;
E is —$CH_2$— or —$CH_2CH_2$—;
F is —$NH_2$ or —$CH_2NH_2$;
G is alkyl having 1–12 carbon atoms;
J is —$NH_2$ or —$CH_2NH_2$;
M is alkyl having 1–12 carbon atoms;
Q is —$NH_2$ or alkyl having 1–12 carbon atoms;
T is alkyl having 1–12 carbon atoms;
$a$ is 1;
$b$, $d$, $e$, $f$, $g$, $j$, $m$, $q$, and $t$ are the same or different and are integers selected from 0 to 1.

The most preferred are the aromatic nitrogen containing compounds of the following formulae:

(X) 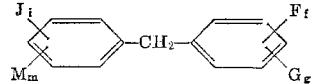

and (XI) 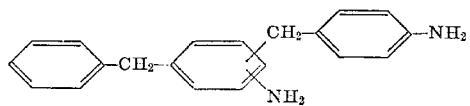

wherein:

F is —$NH_2$ or —$CH_2NH_2$;
J is —$NH_2$ or —$CH_2NH_2$;
G is alkyl of 1 to 4 carbon atoms;
M is alkyl of 1 to 4 carbon atoms;
$f$, $g$, $j$ and $m$ are the same or different and are integers selected from 0 to 1 with the provisio that at least one of $f$, $g$, $j$ or $m$ is 1.

Surprisingly, this process attains good conversions in good yields in reaction times of less than about 60 minutes. In some instances saturation can be obtained in as short a time as 1 to 30 minutes. This process produces minimal amounts of unwanted by-product tars or residues. When MDA is used in the present process, PACM is produced in less than 60 minutes, and even in as short a time as 1 minute, with yields of from 94 to 98% and higher of a PACM isomer mixture containing very little by-product tars and condensation and deamination products. Even more surprisingly, the process of this invention can include a hold period, after saturation is essentially complete, during which the PACM product is isomerized to a ratio of isomers approaching equilibrium ratio without excessive by-product formation.

DESCRIPTION OF THE INVENTION

The general conditions used to hydrogenate aromatic nitrogen containing compounds according to the present process are those which have generally been used and are described for example in the Whitman patent already mentioned. The critical difference between the present process and prior art processes lies in the use of an alkali moderated ruthenium catalyst supported on an inert carrier.

THE CATALYST

The ruthenium catalysts suitable for use in the process of this invention are supported on an inert carrier. Suitable inert carriers are described in Chapter 7 of Catalysis by S. Berkman et al., published by Reinhold Publishing Corp., N.Y. (1940) or Chapter 6 of Catalysis, vol. 1 by P. H. Enmett, published by Reinhold Publishing Corp., N.Y. (1940).

Representative of such carriers are carbon; calcium carbonate; rare earth oxides, such as cerium, praseodymium, or lanthanum; rare earth carbonates, such as cerium, praseodymium, or lanthanum; mixed rare earth oxide-carbonates; alumina; barium sulfate; kieselguhr; pumice; diaspore; bauxite; periclase; zirconia; titania; diatomaceous earth; calcium sulfate; calcium oxide; barium oxide; barium carbonate; strontium carbonate; strontium oxide; strontium sulfate; silica; silica-alumina; etched nickel; or Nichrome and Inconel wire. Preferred catalyst supports are alumina; kieselguhr; barium sulfate; carbon; calcium carbonate; rare earth oxides; rare earth carbonates; and mixed rare earth oxide-carbonates. The most preferred support materials are alumina; barium sulfate; and kieselguhr.

Alkali moderation of the catalysts consists of associating a basic alkali metal compound with the catalyst. Preferred basic alkali metal compounds are:

(1) the hydroxides, carbonates, bicarbonates, methoxides, ethoxides, propoxides, t-butoxides, and other alkoxides of lithium, cesium, rubidium, sodium and potassium, and
(2) sodamide.

Alkali moderation can be accomplished by depositing a ruthenium compound on a support from an aqueous solution of sodium or potassium bicarbonate as disclosed in Ser. No. 516,094, filed Dec. 23, 1965, now abandoned, and its continuation-in-part Ser. No. 691,939, filed Dec. 20, 1967, now abandoned or by treating a supported ruthenium catalyst prior to reduction with dilute sodium or potassium hydroxide as disclosed in Ser. No. 516,109, filed Dec. 23, 1965, now abandoned, and its continuation-in-part Ser. No. 691,938, filed Dec. 20, 1967, now abandoned or by treating a supported ruthenium catalyst after reduction, such as in situ treatment of the catalyst with sodium, lithium or potassium methoxide during a hydrogenation reaction as disclosed in copending application Ser. No. 516,084, filed Dec. 23, 1965, now abandoned, and its continuation-in-part Ser. No. 691,991, filed Dec. 20, 1967, and its continuation-in-part filed Dec. 14, 1970.

Extent of alkali moderation can be determined by analysis of the treated catalyst for alkali metal content using any conventional analytical means such as atomic adsorption spectrophotometry. Thus, for example, if a catalyst analyzes 5% by weight of sodium, it is considered to be alkali moderated to the extent of 5%. The extent of alkali moderation for the catalysts used in the present process should range from 0.1% to 15%. An alumina support for example, will associate to a different degree with a basic alkali metal than will a barium sulfate or kieselguhr support and will depend to a certain degree on the source of the support material. It is preferred that the extent of alkali moderation lie in the range of 0.5% to 10% by weight.

The amount of alkali activated ruthenium catalyst used will be at least 0.001% by weight of the compound to be hydrogenated, calculated as metallic ruthenium. The catalyst can be used in amounts of up to 10% or more, but little practical advantage is gained from the use of larger amounts. Preferably, from about 0.05 to 1.0% by weight of catalyst, calculated as metallic ruthenium, will give desired reactions at reasonable cost. When MDA is hydrogenated, preferably from about 0.01 to about 1.0% by weight of catalyst calculated as metallic ruthenium is used.

PROCESS CONDITIONS

The temperature used in this invention will be in the range of from about 100° to 300° C., and for most compounds it is preferably about 180° to 220° C. When MDA is hydrogenated, the preferred temperature range is from about 150° C. to about 275° C. and the most preferred temperature range is from 180 to 245° C.

The process is run at hydrogen partial pressure above about 200 p.s.i., and ordinarily between about 2000 and 5500 p.s.i. Higher hydrogen partial pressures can be used if desired but little practical advantage is obtained. The total pressure during hydrogenation will ordinarily be above 200 p.s.i. and can be as high as 15,000 p.s.i., a practical upper limit for reasons of cost of operation and equipment.

The process of this invention can be run in the presence or absence of a solvent. In the case of aromatic amines with melting points greater than 100° C., the use of a solvent is often desirable to simplify processing. The most desirable solvent is the hydrogenation product itself. It is preferred to employ no solvent since the addition of solvents tends to reduce catalyst life. When a solvent is used, liquids not subject to hydrogenation under the process conditions should be employed. Representative of the suitable solvents are saturated aliphatic and alicyclic hydrocarbons, such as cyclohexane, hexane, and cyclooctane; low molecular weight alcohols, such as methyl alcohol, ethyl alcohol, isopropyl alcohol, n-butanol, and preferably aliphatic and alicyclic hydrocarbon ethers, such as n-propyl ether, n-butyl ether, ethyl ether, isopropyl ether, isobutyl ether, the amyl ethers, tetrahydrofuran, dioxane, and dicyclohexylether. Water can also be used as a solvent. Mixtures of two or more of the above solvents are also suitable.

When a solvent is used, it can be used in concentrations as low as about 0.2 parts of solvent per part of starting compound introduced into the reaction. However, amounts of solvent from about 25% to 150% of the weight of starting compound will normally be used. Greater amounts of solvent can of course be used, even as high as 1000% to 2000% based on the starting compound, but such amounts merely dilute the components in the reaction mass with no particular advantages obtained. If MDA is hydrogenated in the presence of a solvent, preferably from about 0.4 to about 1.0 part of solvent for each part of amine is used.

The description of the process of this invention has been directed principally to a batch process. However, as will be understood by those skilled in the art, the process can be operated continuously. The variables and factors involved in the batch process can, by routine calculation, be converted to a continuous process. The relationships between batch and continuous reaction systems are described in detail in such references as O. Levenspiel, Chemical Reaction Engineering, John Wiley (1962), and H. Krames et al., Chemical Reactor Design and Operation, Academic Press (1963). The reaction times disclosed in the examples are applicable to continuous reactor systems only if there is no back mixing of products with reactants. As is known by those skilled in the art, continuous systems in which back mixing is employed require longer reaction times to accomplish equivalent degrees of conversion except for reactions whose rates are independent of reactant concentration. It will also be apparent to those skilled in the art that in a continuous process being operated in a thoroughly back-mixed fashion, the quantity of catalyst to be used, though still within the previously described range, will be calculated on the basis of total reactor content rather than the initial charge as is done in batch process.

OPTIONAL USE OF AMMONIA

The compounds which can be hydrogenated in the process of this invention can be classified in two broad groups, characterized in that the hydrogenation of compounds of one of the groups, hereinafter called Group A, the presence of added ammonia is optional in that no readily observable benefit is obtained by the presence of ammonia. However, failure to observe improved results when ammonia is present during hydrogenation of the latter group could be due merely to the outstanding results obtainable in the absence of ammonia which makes experimental determination of additional improvement extremely difficult. The aromatic nitrogen containing compounds falling within Group A are those having the formulae:

(XII) 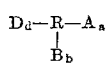

(XIII) 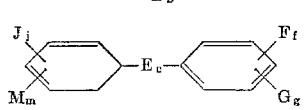

(XIV) 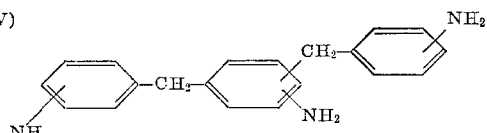

(XV) 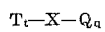

wherein:

R is benzene, naphthalene, anthracene, or fluorene;
X is pyridine, quinoline, or indole;
A is —$NH_2$ or —$CH_2NH_2$;
B is —$NH_2$, alkyl having 1 to 12 carbon atoms, or alkoxy having 1–5 carbon atoms;
D is alkyl having 1–12 carbon atoms, alkoxy having 1–5 carbon atoms, or —OH;
E is —$CH_2$—, —$CH_2CH_2$—, or —O—;
F is —$NH_2$ or —$CH_2NH_2$;
G is alkyl having 1–12 carbon atoms;
J is —$NH_2$ or —$CH_2NH_2$;
M is alkyl having 1–12 carbon atoms;
Q is —$NH_2$ or alkyl having 1–12 carbon atoms;
T is alkyl having 1–12 carbon atoms;
$a$ is 1;
$b$, $d$, $e$, $f$, $g$, $j$, $m$, $q$, and $t$ are the same or different and are integers selected from 0 to 1 with the provisio that at least one of $f$, $g$, $j$ or $m$ is 1.

Hydrogenation of compounds of Group A can be conducted in the presence or absence of added ammonia. If ammonia is used it can be used in amounts up to 200% or more based on the weight of the compound to be hydrogenated. In fact, it appears that there is no upper limit to the amount of ammonia which can be present without deleterious effect on the process.

The hydrogenation of the aromatic nitrogen containing compounds which are within the scope of Formulae I through V but not within the scope of Group A, is materially improved by the presence of ammonia in the reaction system. This latter group of compounds will be referred to as Group B. While it is not necessary to hydrogenate the compounds of Group B in the presence of ammonia, it is preferable that the hydrogenation of said compounds be conducted in the presence of amounts of ammonia of from less than 1 to about 200% based on the weight of the compound to be hydrogenated. Amounts of 5 to 40% are preferred. However, there appears to be no upper limit to the amount of ammonia which can be present without deleterious effect on the process. Amounts as high as 400% and higher can be used.

When MDA is hydrogenated, from about 1 to more than 100% by weight of ammonia, based on the weight of MDA, can be used in this process. However, since the use of ammonia imparts little or no observable benefit in the hydrogenation of MDA, the process will normally be operated in the absence of added ammonia.

ILLUSTRATIONS OF SUITABLE AMINES

The compounds which can be hydrogenated according to the process of this invention are generally those shown in Formulae I through V shown above. Representative of such compounds are:

Aniline
2-ethylaniline
N,N-dimethylaniline
N-ethyl-N-methylaniline
2,4-diamino-N-phenylaniline
o, m, and p-phenylenediamine
2,4-diaminotoluene
1,2,4,5-tetraaminobenzene
4-methoxy-m-phenylenediamine
4-amino-m-cresol
4-amino-2,5-xylenol
4-amino-N-phenylaniline
2-amino-N-methylaniline
2-methoxy-N-methylaniline
o, m, and p-aminobenzonitrile
N-methylaniline
o, m, and p-toluidine
N-isobutyl-p-phenylenediamine
o, m, and p-xylylenediamine
o, m, and p-anisidine
N-isoamyl-p-phenylenediamine
N-benzyl-p-phenylenediamine
N-cyclohexyl-p-phenylenediamine
N,N'-di(n-propyl)-p-phenylenediamine
N-(n-butyl)-N'-benzyl-p-phenylenediamine
N,N'-dibenzyl-p-phenylenediamine
N-ethyl-m-phenylenediamine
N-ethyl-o-phenylenediamine
N-methyl-m-phenylenediamine
N,N-diethyl-p-phenylenediamine
N-methyl-N-(n-propyl)-p-phenylenediamine
N-(p-aminophenyl)piperidine
Benzylamine
N-isopropylaniline
N-ethyl-o-toluidine
N-ethyl-m-toluidine
N-ethyl-N-benzyl-m-toluidine
p-(N,N-dimethylamino)benzylamine
N-phenylbenzylamine
N,N-dimethylbenzylamine
N-ethyl-N-phenylbenzylamine
N-phenyl-p-phenylenediamine
1-amino-naphthalene
1-(aminomethyl)-2-hydroxynaphthalene
N-ethyl-1-aminonaphthalene
N-decyl-1-aminonaphthalene
N-phenyl-1-aminonaphthalene
1,5-diaminonaphthalene
Pyridine
3-aminopyridine
2-amino-4,6-dimethylpyridine
2,4-dimethylpyridine
2,6-diaminopyridine
2-amino-5-methylpyridine
2-(2-aminoethyl)pyridine
2-aminopyridine
4,4'-methylenedianiline
Benzidine
Tolidine
4,4'-methylenedi(1-naphthylamine)
4,4'-oxydianiline
4,4'-ethylenedianiline
4,4'-methylenebis(3-methoxyaniline)

4,4'-methylenedibenzylamine
4,4'-methylenebis(N-ethyl-o-toluidine)
2,4-bis(4-aminobenzyl)aniline
4,4'-methylenebis(N,N-dimethylaniline)
4,4'-methylenebis(N-methylaniline)
N,N,N',N'-tetramethylbenzidine
Bis(3,4-diaminophenyl)methane
Bis(3-methyl-4-aminophenyl)methane
2,7-diaminofluorene
2-aminofluorene
3-aminoquinoline
8-aminoquinoline
5-aminoindole
3-[(dimethylamine)methyl]indole
1-aminoanthracene
2-aminoanthracene The preferred amines are:

o, m, and p-phenylenediamine
o, m, and p-toluidine
4,4'-methylenedianiline
Benzidine, and
2,4-bis(4-aminobenzyl)aniline The most preferred amine is:

4,4'-methylenedianiline

EXAMPLES

This invention will be better understood by reference to the following illustrative examples wherein parts and percentages are by weight unless otherwise specified.

EXAMPLE 1

In a 400 cc. agitated pressure vessel, at a temperature of 225° C., and a hydrogen pressure of 5000 p.s.i.g., 150 parts of 4,4'-methylenedianiline and 2 parts of sodium methoxide are subjected to hydrogenation utilizing 10 parts of a finely divided catalyst comprising 5% ruthenium on alumina for a period of 40 minutes plus an additional 10-minute hold-up at 225° C. The resulting mixture is freed of catalyst by filtration. Distillation under vacuum gives a high boiling distillation residue of 1.5% and the fully saturated mixture of isomers of 4,4'-methylenedi(cyclohexylamine) in an amount equal to a yield of 98.0% based on the amount of 4,4'-methylenedianiline introduced into the process. The product had an isomer content of 9.0% cis,cis; 42.8% cis,trans; and 47.2% trans,trans. The recovered catalyst is found to contain 1.6% sodium.

EXAMPLE 2

At a temperature of 225° C. and a hydrogen pressure of 2000 p.s.i.g. in a 400 cc. agitated pressure vessel, 100 parts of 4,4'-methylenedianiline, 50 parts of ethyl ether, 25 parts of ammonia, and 2 parts of sodium propoxide are subjected to hydrogenation utilizing 10 parts of a finely divided catalyst comprising 5% ruthenium on alumina for a period of 30 minutes plus an additional 10-minute hold-up at 225° C. The resulting mixture is freed of catalyst by filtration and distilled to strip off solvent. Final distillation under vacuum gives the fully saturated mixture of isomers of 4,4'-methylenedi(cyclohexylamine) in an amount equal to a yield of 99.2% on the amount of 4,4'-methylenedianiline introduced into the process.

EXAMPLE 3

In a suitable pressure vessel, at a temperature of 210° C. and a hydrogen pressure of 4500 p.s.i.g., 150 parts of 4,4'-methylenedianiline and 2 parts of potassium t-butoxide are subjected to hydrogenation utilizing 10 parts of a finely divided catalyst comprising 5% ruthenium on alumina. The hydrogenated mixture is freed of catalyst by filtration. Final distillation under vacuum gives 4,4'-methylenedi(cyclohexylamine) in good yield.

EXAMPLE 4

Example 3 is repeated substituting 5000 parts of 4,4'-methylenedianiline for the 150 parts used initially. All other conditions are as described above and a good yield of 4,4'-methylenedi(cyclohexylamine) is obtained.

EXAMPLES 5–8

Example 3 is repeated substituting for the potassium t-butoxide the alkali metal compound listed below in the amount indicated. Similar results to those of Example 3 are obtained:

| Example | Alkali metal compound | Amount |
|---|---|---|
| 5 | Lithium methoxide | 20 parts of 10% solution in methanol. |
| 6 | Sodamide | 2.5 parts. |
| 7 | Potassium hydroxide | 0.75 part of 50% aqueous solution. |
| 8 | Sodium hydroxide | 0.50 part of 50% aqueous solution. |

EXAMPLE 9

One hundred parts of a 5% ruthenium on alumina catalyst is slurried in 1215 parts of n-butanol containing 9 parts of sodium methoxide. The mixture is heated to 100° C., held for 10 minutes, filtered, washed with acetone, and air-dried. Two samples are removed, one sample of 5 parts and the other a sample of 10 parts. The 5-part sample is assayed for sodium and is recorded in the table as percent sodium, start. The 10-part sample is mixed with 450 parts of 4,4'-methylenedianiline, and the mixture is hydrogenated at 225° C. and 4500 p.s.i. hydrogen. This is coded Run A in the table. The remaining unused catalyst is slurried with 1029 parts of n-butanol and 7.65 parts of sodium methoxide, then heated, filtered, washed, dried and sampled as above. The two samples are also analyzed and used as above and the results are recorded as Run B. The remaining catalyst is slurried with 850 parts of n-butanol and 6.3 parts of sodium methoxide. After following all of the same steps as above, the results are coded as Run C. The remaining catalyst is slurried with 692 parts of n-butanol and 4.95 parts of sodium methoxide, and is then treated as above. The results are recorded as Run D. The remaining catalyst is slurried with 486 parts of n-butanol and 3.6 parts of sodium methoxide, and is then treated as above, the results being coded as Run E. The remaining catalyst is slurried with 304 parts of n-butanol and 2.25 parts of sodium methoxide and is then treated as above. The results are recorded as Run F. The remaining catalyst is slurried with 122 parts of n-butanol and 0.9 parts of sodium methoxide, is treated as above, and the results are recorded as Run G.

The following table gives the percent yield of vacuum distilled product, 4,4'-methylenedi(cyclohexylamide), percent sodium in the catalyst before use in the hydrogenation reaction, percent sodium in the catalyst after use in the hydrogenation reaction, and the analytically determined ratios of the three stereoisomers in the final product.

| Run | Catalyst, percent Na | | Hydrogenation product, percent | | | |
|---|---|---|---|---|---|---|
| | Before hydrogenation | After hydrogenation | Yield | Cis, cis isomer | Cis, trans isomer | Trans, trans isomer |
| A | 2.3 | [1] 1.5 | 97.0 | 8.7 | 42.7 | 48.6 |
| B | 3.8 | [1] 2.5 | 98.3 | 8.0 | 42.1 | 49.9 |
| C | 4.8 | [1] 4.2 | 98.1 | 10.5 | 43.5 | 46.0 |
| D | 5.8 | [2] 5.7 | 96.6 | 10.2 | 42.7 | 47.1 |
| E | 6.6 | [2] 6.6 | 99.2 | 10.9 | 43.8 | 45.3 |
| F | 7.2 | [2] 6.9 | 98.5 | 10.7 | 43.3 | 46.0 |
| G | 8.2 | [2] 7.6 | 98.4 | 9.2 | 41.5 | 49.3 |

[1] Methanol washed.
[2] Acetone washed.

EXAMPLE 10

At a temperature of 190° C. and a total pressure of 10,000 p.s.i.g. in a suitable pressure vessel, 100 parts of 4,4'-methylenedianiline, 50 parts dioxane, and 2 parts sodium methoxide are subjected to hydrogenation utilizing 10 parts of a finely divided catalyst comprising about 5% ruthenium on alumina for a period of 20 minutes. The resulting mixture is freed of catalyst by filtration and distilled to strip off solvent. Final distillation under vacuum gives a high boiling distillation residue of 1.5% and the fully saturated mixture of isomers of 4,4'-methylenedi(cyclohexylamine) in an amount equal to a yield of 98.3% based on the amount of methylenedianiline introduced into the process. The recovered catalyst is found to contain 1.3% sodium or 0.4 part as sodium methoxide.

EXAMPLE 11

At a temperature of 225° C. and a total pressure of 5,000 p.s.i.g. in a suitable pressure vessel, 100 parts of 4,4'-methylenedianiline, and 50 parts dioxane are subjected to hydrogenation utilizing 9.5 parts of ruthenium on alumina catalyst recovered from Example 10 for a period of 20 minutes. The resulting mixture is freed of catalyst by filtration and distilled to strip off solvent. Final distillation under vacuum gives the fully saturated mixture of isomers of 4,4'-methylenedi(cyclohexylamine) in an amount equal to a yield of 98.5% based on the amount of 4,4'-methylenedianiline introduced into the process, and a residue of 1.2%.

EXAMPLE 12

At a temperature of 275° C. and a total pressure of 5,000 p.s.i.g. in a suitable pressure vessel, 100 parts of 4,4'-methylenedianiline, and 50 parts of isopropyl ether are subjected to hydrogenation utilizing 8.5 parts of ruthenium on alumina catalyst recovered from Example 11 for a period of 20 minutes. The resulting mixture is freed of catalyst by filtration and distilled to strip off solvent. Final distillation under vacuum gives a good yield of 4,4'-methylenedi(cyclohexylamine). The trans,trans-isomer content of the resulting product is 53.2%.

EXAMPLE 13

In a suitable agitated pressure vessel, at a temperature of 225° C. and a hydrogen pressure of 5000 p.s.i.g., 100 parts of 4,4'-methylenedianiline and 50 parts dioxane are subjected to hydrogenation utilizing 10 parts of a finely divided catalyst comprising 5% ruthenium on kieselguhr until the hydrogen uptake stops. A second hydrogenation test is made as described above with the addition of 0.5 part sodium methoxide to the reaction mixture. The resulting product mixture from each test is freed of catalyst by filtration and distilled to strip off the solvent. Final distillation under vacuum gives the fully saturated mixture of isomers of 4,4'-methylenedi(cyclohexylamine). The yield data comparing hydrogenations with and without caustic moderation of the catalyst in the absence of added ammonia and the sodium content of the catalyst recovered from the hydrogenation tests is shown in the following table:

| Caustic moderation | Percent | | |
| --- | --- | --- | --- |
| | Na | PACM yield | Distillation residue |
| None | 0.058 | 71.0 | 27.7 |
| Sodium methoxide | 1.1 | 98.1 | 1.5 |

EXAMPLE 14

In a suitable agitated pressure vessel, at a temperature of 225° C. and a hydrogen pressure of 5000 p.s.i.g., 450 parts of 4,4'-methylenedianiline is subjected to hydrogenation utilizing 10 parts of a finely divided catalyst comprising 5% ruthenium on barium sulfate until the hydrogen uptake stops. A second hydrogenation test is made as described above with the addition of 2 parts sodium methoxide to the reaction mixture. The resulting product mixture from each test is freed of catalyst by filtration. Final distillation under vacuum gives the fully saturated mixture of isomers of 4,4'-methylenedi(cyclohexylamine). The yield data comparing hydrogenations with and without caustic moderation of the catalyst in the absence of added ammonia and the sodium content of the catalyst recovered from the hydrogenation tests is shown in the following table:

| Caustic moderation | Percent | | |
| --- | --- | --- | --- |
| | Na | PACM yield | Distillation residue |
| None | 0.005 | 87.0 | 12.2 |
| Sodium methoxide | 4.8 | 99.2 | 0.4 |

EXAMPLE 15

In a steel autoclave fitted with a stirring apparatus and a product draw off system retaining the catalyst in the reactor, there are placed 2000 parts of 4,4'-methylenedi(cyclohexylamine). 60 parts of a finely divided 5% ruthenium on a kieselguhr support and 12 parts of sodium propoxide. The material is heated to 225° C. with stirring and hydrogen added to maintain a pressure of 290 atmospheres. A mixture of 65% 4,4'-methylenedianiline and 35% of a mixture of 4,4'-methylenedi(cyclohexylamine) isomers low in the trans,trans-isomer is fed at such a rate to maintain a 55 minute resident time while product is drawn off to maintain a fixed reactor volume. Final distillation under vacuum gives a high-boiling residue of less than 1% and the fully saturated mixture of isomers of 4,4' - methylenedi(cyclohexylamine) in an amount equal to a yield of 98.9%. The product has an isomer content of 10.0% cis,cis; 42.8% cis,trans; and 47.2% trans,trans.

EXAMPLE 16

In a steel autoclave fitted with a stirring apparatus and a product draw off system retaining the catalyst in the reactor, there are placed 200 parts of 4,4'-methylenedi(cyclohexylamine), 100 parts of a finely divided 5% ruthenium on an alumina support and 15 parts of potassium methoxide. The material is heated to 290° C. with stirring and hydrogen added to maintain a pressure of 290 atmospheres. A mixture of 65% 4,4'-methylenedianiline and 35% of a mixture of 4,4'-methylenedi(cyclohexylamine) isomers low in the trans,trans-isomer is fed at such a rate to maintain a 20 minute resident time while product is drawn off to maintain a fixed reactor volume. Final distillation under vacuum gives the fully saturated mixture of isomers of 4,4'-methylenedi(cyclohexylamine). The product has an isomer content of 10.9% cis,cis; 42.3% cis,trans; and 46.8% trans,trans.

EXAMPLE 17

In a steel autoclave fitted with a stirring apparatus and a product draw off system retaining the catalyst in the reactor, there are placed 2000 parts of 4,4'-methylenedi (cyclohexylamine), 60 parts of a finely divided 5% ruthenium on a barium sulfate support and 12 parts of sodium ethoxide. The material is heated to 245° C. with stirring and hydrogen added to maintain a pressure of 290 atmospheres. A mixture of 50% 4,4'-methylenedianiline and 50% of a mixture of 4,4'-methylenedi(cyclohexylamine) isomers low in the trans,trans-isomer is fed at such a rate to maintain a 48 minute resident time while product is drawn off to maintain a fixed reactor volume. Final distillation under vacuum gives the fully saturated mixture of isomers of 4,4'-methylenedi(cyclohexylamine) in high yield. The resulting product has an isomer content of 9.9% cis,cis; 40.7% cis,trans; and 49.4% trans,trans.

EXAMPLE 18

In a steel autoclave fitted with a stirring apparatus and a product draw off system retaining the catalyst in the reactor, there are placed 2000 parts of 4,4'-methylenedi(cyclohexylamine), 100 parts of a finely divided 5% ruthenium on an alumina support and 15 parts of sodium methoxide. The material is heated to 212° C. with stirring and hydrogen added to maintain a pressure of 290 atmospheres. A mixture of 65% 4,4'-methylenedianiline and 35% of a mixture of 4,4'-methylenedi(cyclohexylamine) isomers low in the trans,trans-isomer is fed at such a rate to maintain a 32 minute resident time while product is drawn off to maintain a fixed reactor volume. Final distillation under vacuum gives a residue of 2.0% and a fully saturated mixture of isomers of 4,4'-methylenedi(cyclohexylamine) in an amount equal to a yield of 97.8%. The resulting product has an isomer content of 9.5% cis,cis; 41.6% cis,trans; and 48.9% trans,trans.

EXAMPLE 19

In a steel autoclave fitted with a stirring apparatus and a product draw off system retaining the catalyst in the reactor, there are placed 2000 parts of 4,4'-methylenedi(cyclohexylamine), 200 parts of a finely divided 5% ruthenium on a kieselguhr support and 13 parts of 50% aqueous potassium hydroxide solution. The material is heated to 225° C. with stirring and hydrogen added to maintain a pressure of 290 atmospheres. 4,4'-methylenedianiline is fed at such a rate to maintain a 30 minute resident time while product is drawn off to maintain a fixed reactor volume. Final distillation under vacuum gives a high-boiling residue of 1.4% and the fully saturated mixture of isomers of 4,4'-methylenedi(cyclohexylamine) in an amount equal to a yield of 98.5% based on the amount of aromatic compound introduced into the process. The resulting product has an isomer content of 10.6% cis,cis; 41.8% cis,trans; and 47.6% trans,trans.

EXAMPLE 20

A solution is prepared consisting of 5.6 parts of ruthenium chloride, 6.7 parts of 37% hydrochloric acid, and 74 parts of water. This solution is warmed to 65° C., whereupon addition of a solution of 20 parts of sodium bicarbonate in 190 parts of water is begun. When ⅓ of the sodium bicarbonate solution is added, the support material is dumped into the solution while stirring. The support consists of an intimate physical mixture of 50 parts of "eta" alumina and 0.75 part of sodium methoxide. The remaining sodium bicarbonate solution is then added at such a rate that approximately 4 minutes is required to complete the addition. The resulting slurry is digested for one hour at 65–70° C. and is then filtered and washed with 1200 parts of aqueous sodium bicarbonate solution. The product is given an additional wash with 845 parts of a 5% sodium hydroxide solution in water, and is then sucked dry. The air-dried cake is further dried at 150° C. then activated prior to use at 170–200° C. in a stream consisting of 95% nitrogen and 5% hydrogen.

By assay, the above catalyst contains 1.6% sodium by weight. Ten parts of the above prepared catalyst is mixed with 100 parts of 4,4'-methylenedianiline and 50 parts of dioxane and the resulting mixture is hydrogenated at 225° C. and a total pressure of 5000 p.s.i.g. for 30 minutes. Workup of the hydrogenation product gives a fully saturated mixture of stereoisomers of 4,4'-methylenedi-(cyclohexylamine) in 97.9% yield and 2.0% of high-boiling residue. The product contains 49.9% of the trans, trans-stereoisomer. The catalyst is recovered, washed with acetone to remove organics and analyzed again for sodium, and is found to contain 1.3% by weight.

EXAMPLE 21

At a temperature of 165° C. and a hydrogen pressure of 5000 pounds per square inch gage in a suitable pressure vessel, 500 parts of 4,4'-methylenedianiline and 10 parts of a finely divided catalyst comprising 5% ruthenium on alumina and containing 1.6% sodium are subjected to hydrogenation. The hydrogenation mixture is freed of catalyst by filtration. Final distillation under vacuum gives a good yield of 4,4'-methylenedi(cyclohexylamine). The product has an isomer content of 13.8% cis,cis; 56.5% cis,trans; and 29.7% trans, trans.

EXAMPLE 22

At a temperature of 160° C. and a hydrogen pressure of 4500 pounds per square inch gage in a suitable pressure vessel, 100 parts of 4,4'-methylenedianiline and 2 parts potassium t-butoxide are subjected to hydrogenation utilizing 10 parts of a finely divided catalyst comprising 5% ruthenium on alumina. The hydrogenation mixture is freed of catalyst by filtration. Final distillation under vacuum gives 4,4'-methylenedi(cyclohexylamine) in a yield of 96.9% and a residue of 2.7%. The product isomer content is 24.0% cis,cis; 49.7% cis,trans; and 26.3% trans,trans.

EXAMPLE 23

Hydrogenation of 150 parts of 4,4'-methylenedianiline is conducted at a temperature of 225° C., and a hydrogen pressure of 4500 pounds per square inch gage in a suitable pressure vessel utilizing 10 parts of a finely divided 5% ruthenium on alumina catalyst and using 20 parts of a 10% solution of lithinum methoxide in methanol. The hydrogenation mixture is freed of catalyst and distilled to give 4,4'-methylenedi(cyclohexylamine) in a yield of 96.5% and 3.0% of residue. The isomer content of the product is 10.7% cis,cis; 40.9% cis,trans; and 48.4% trans,trans.

EXAMPLE 24

Hydrogenation of 4,4'-methylenedianiline is again conducted under the conditions described in Example 23, using 2.5 parts of sodamide in place of the lithium methoxide solution. 4,4'-methylenedi(cyclohexylamine) is obtained in yield of 96.7% with 3.0% of distillation residue. The product isomer content is 10.3% cis,cis; 42.5% cis,trans; and 47.2% trans,trans.

EXAMPLE 25

Example 23 is repeated substituting 0.75 parts of a 50% solution of potassium hydroxide in water in place of the lithium methoxide solution. 4,4'-methylenedi(cyclohexylamine) is obtained in a yield of 97.0% with 1.2% of distillation residue. The product isomer content is 8.9% cis,cis; 39.9% cis,trans; and 51.2% trans,trans.

EXAMPLE 26

Example 23 is repeated substituting 0.50 parts of a 50% solution of sodium hydroxide in water in place of the lithium methoxide solution. 4,4'-methylenedi(cyclohexylamine) is obtained in a yield of 98.2% and the distillation residue is 1.4%. The product has an isomer content of 8.9% cis,cis; 40.9% cis,trans; and 50.2% trans, trans.

EXAMPLE 27

At a temperature of 175° C. and a hydrogen pressure of 2500 pounds per square inch gage in a suitable pressure vessel, 100 parts of 4,4'-methylenedianiline is subjected to hydrogenation utilizing 10 parts of a finely divided catalyst comprising about 5% ruthenium on carbon and 1.5 parts of sodium methoxide for a period of 50 minutes. The resulting mixture is freed of catalyst by filtration and distillation under vacuum gives 4,4'-methylenedi(cyclohexylamine) in a yield of 98.0% and a distillation residue of 1.7%. The distilled product contains 25.5% of the trans,trans-isomer.

EXAMPLE 28

In a 400 cc. agitated pressure vessel, at a temperature of 225° C. and a hydrogen pressure of 5000 p.s.i.g., 100 parts of 4,4'-methylenedianiline, 50 parts dioxane and 10 parts ammonia are subjected to hydrogenation utilizing 10 parts of a finely divided catalyst comprising 5% ruthenium on alumina until the hydrogen uptake stops. A second hydrogenation test is made as described above with the addition of 1.5 parts sodium methoxide to the reaction mixture. The resulting product mixture from each test is freed of catalyst by filtration and distilled to strip off the solvent. Final distillation under vacuum gives the fully saturated mixture of isomers of 4,4'-methylenedi(cyclohexylamine). The yield data comparing hydrogenations with and without caustic modernation of the catalyst in the presence of ammonia is shown in the following table:

| Caustic moderation | PACM yield, percent | Deamination by-products, percent | |
| --- | --- | --- | --- |
| | | High boiling residues [1] | Low boiling amine [2] |
| None | 93.4 | 4.2 | 2.4 |
| Sodium methoxide | 98.7 | 0.8 | 0.5 |

[1] Distilation residue consisting of polyamine condensation products.
[2] The low boiling amine is 4-(cyclohexylmaethyl)cyclohexylamine formed by the cleavage of one amine group.

EXAMPLE 29

In a 400 cc. agitated pressure vessel, at a temperature of 225° C. and a hydrogen pressure of 5000 p.s.i.g., 100 parts of 4,4'-methylenedianiline and 50 parts dioxane are subjected to hydrogenation utilizing 10 parts of a finely divided catalyst comprising 5% ruthenium on alumina until the hydrogen uptake stops. A second hydrogenation test is made as described above with the addition of 1.5 parts sodium methoxide to the reaction mixture. The resulting product mixture from each test is freed of catalyst by filtration and distilled to strip off the solvent. Final distillation under vacuum gives the fully saturated mixture of isomers of 4,4'-methylenedi(cyclohexylamine). The yield data comparing hydrogenations with and without caustic moderation of the catalyst in the absence of added ammonia is shown in the following table.

| Caustic moderation | PACM yield, percent | Deamination by-products, percent | |
| --- | --- | --- | --- |
| | | High boiling residues [1] | Low boiling amine [2] |
| None | 79.2 | 19.8 | 1.0 |
| Sodium methoxide | 97.1 | 2.5 | 0.4 |

[1] Distillation residue consisting of polyamine condensation products.
[2] The low boiling amine is 4-(cyclohexylmethyl)cyclohexylamine formed by the cleavage of one amine group.

EXAMPLE 30

At a temperature of 225° C. and a hydrogen pressure of 4500 p.s.i.g. in a suitable pressure vessel, 150 parts of 4,4'-methylenedianiline is subjected to hydrogenation utilizing 10 parts of a finely divided catalyst comprising 5% ruthenium on calcium carbonate and 1.5 parts of sodium methoxide for a period of 40 minutes. The resulting mixture is freed of catalyst by filtration and distillation under vacuum gives the fully saturated mixture of isomers of 4,4'-methylenedi(cyclohexylamine) in an amount equal to a yield of 98.6% based on the amount of 4,4'-methylenedianiline introduced into the process.

EXAMPLE 31

At a temperature of 225° C. and a hydrogen pressure of 4500 p.s.i.g. in a suitable pressure vessel, 150 parts of 4,4'-methylenedianiline is subjected to hydrogenation utilizing 10 parts of a finely divided catalyst comprising 5% ruthenium on rare earth oxides and 1.5 parts of sodium methoxide for a period of 30 minutes. The resulting mixture is freed of catalyst by filtration and distillation under vacuum gives the fully saturated mixture of isomers of 4,4'-methylenedi(cyclohexylamine) in an amount equal to a yield of 97.9% based on the amount of 4,4'-methylenedianiline introduced into the process.

The rare earth oxide support material is a mixture of rare earth oxides commercially derived from the extradition of the rare earth components in their normally occurring ratio as found in monazite ore.

EXAMPLE 32

At a temperature of 225° C. and a hydrogen pressure of 4500 p.s.i.g. in a suitable pressure vessel, 150 parts of 4,4'-methylenedianiline is subjected to hydrogenation utilizing 10 parts of a finely divided catalyst comprising 5% ruthenium on carbon and 1.5 parts of sodium methoxide. The resulting mixture is freed of catalyst by filtration and distillation under vacuum gives the fully saturated mixture of isomers of 4,4'-methylenedi(cyclohexylamine) in an amount equal to a yield of 97.0% based on the amount of 4,4'-methylenedianiline introduced into the process.

EXAMPLE 33

At a temperature of 230° C. and a hydrogen pressure of 4500 p.s.i.g. in a suitable pressure vessel, 150 parts of 4,4'-methylenedianiline is subjected to hydrogenation utilizing 10 parts of a finely divided catalyst comprising 5% ruthenium on alumina and 4 parts of a 50% aqueous slurry of cesium hydroxide. The resulting mixture is freed of catalyst by filtration and distillation under vacuum gives the fully saturated mixture of isomers of 4,4'-methylenedi(cyclohexylamine) in an amount equal to a yield of 97.0% based on the amount of 4,4'-methylenedianiline introduced into the process.

EXAMPLE 34

At a temperature of 225° C. and a hydrogen pressure of 4500 p.s.i.g. in a suitable pressure vessel, 150 parts of 4,4'-methylenedianiline is subjected to hydrogenation utilizing 10 parts of a finely divided catalyst comprising 5% ruthenium on alumina and 4 parts of a 50% aqueous slurry of rubidium hydroxide. The resulting mixture is freed of catalyst by filtration and distillation under vacuum gives the fully saturated mixture of isomers of 4,4'-methylenedi(cyclohexylamine) in an amount equal to a yield of 97.1% based on the amount of 4,4'-methylenedianiline introduced into the process.

EXAMPLE 35

At a temperature of 210° C. and a hydrogen pressure of 3500 p.s.i.g. in a suitable pressure vessel, 250 parts of 4,4'-methylenebis(N,N-dimethylaniline), 250 parts of dioxane, 50 parts of ammonia, and 2 parts of sodium methoxide are subjected to hydrogenation utilizing 10 parts of a finely divided catalyst comprising 5% ruthenium on alumina. Hydrogenation proceeds until the hydrogen uptake stops plus an additional 15-minute holdup at 225° C. The resulting mixture is freed of catalyst by filtration and distilled to strip off solvent. Final distillation under vacuum gives a good yield of 4,4'-methylenebis(N,N - dimethylcyclohexylamine). The recovered catalyst is analyzed and is found to contain 1.3% sodium which corresponds to 0.3 part of sodium methoxide.

EXAMPLE 36

In a steel autoclave fitted with a stirring apparatus and a product draw off system retaining the catalyst in the reactor, there are placed 2000 ml. of 50% 1,3-diaminocyclohexane in dioxane, 100 parts of a finely divided 5% ruthenium on an alumina support, 20 parts of sodium methoxide, and 1000 parts of ammonia. The material is heated to 220° C. with stirring and hydrogen is added to maintain a pressure of 700 atmospheres. A mixture of 50% m-phenylenediamine and 50% dioxane is fed at such a rate to maintain a 45 minute resident time as the product is drawn off to maintain a fixed reactor volume. Ammonia is fed at the rate of 1 part ammonia to 2 parts m-phenylenediamine. The resulting product is distilled to strip off solvent. Final distillation under vacuum gives 1,3-diaminocyclohexane in an amount equal to a yield of 95.0%, based on m-phenylenediamine converted.

EXAMPLE 37

At a temperature of 250° C. and a total pressure of 5000 p.s.i.g. in a suitable pressure vessel, 40 parts of 4,4'-ethylenedianiline, 50 parts of cyclohexane, 40 parts of ammonia, and 1 part of potassium methoxide are subjected to hydrogenation utilizing 20 parts of a finely divided catalyst comprising about 5% ruthenium on kieselguhr. Hydrogenation continues until the hydrogen uptake stops plus an additional 5-minute hold-up at 250° C. The resulting mixture is freed of catalyst by filtration and distilled to strip off solvent. Final distillation under vacuum gives the fully saturated mixture of isomers of 4,4'-ethylenedi(cyclohexylamine) in an amount equal to a yield of 98.3% based on the amount of 4,4'-ethylenedianiline introduced into the process.

EXAMPLE 38

At a temperature of 200° C. and a total pressure of 5000 p.s.i.g. in a suitable pressure vessel, 100 parts of N,N-dimethylaniline, 100 parts of dioxane, 25 parts of ammonia, and 2 parts of sodium methoxide are subjected to hydrogenation utilizing 10 parts of a finely divided catalyst comprising 5% ruthenium on alumina. Hydrogenation is continued for a period of 30 minutes plus an additional 10-minute hold-up at 225° C. The resulting mixture is freed of catalyst by filtration and distilled to strip off solvent. Final distillation under vacuum gives N,N-dimethylcyclohexylamine in an amount equal to a yield of 94.5% based on the amount of N,N-dimethylaniline introduced into the process.

EXAMPLE 39

Under the conditions described in Example 38, using a ruthenium catalyst supported on barium sulfate, N-methylaniline is hydrogenated to yield N-methylcyclohexylamine in good yield.

EXAMPLE 40

Under the conditions described in Example 38, using a ruthenium catalyst supported on kieselguhr, 4,4'-methylenebis(N - methyaniline) is hydrogenated to yield 4,4'-methylenebis(N-methylcyclohexylamine) in good yield.

EXAMPLE 41

Under the conditions described in Example 38, 1,2,4,5-tetraaminobenzene is hydrogenated to yield, 1,2,4,5-tetraaminocyclohexane.

EXAMPLE 42

A solution is prepared consisting of 5.6 parts of ruthenium chloride, 6.7 parts of 37% hydrochloric acid, and about 70 parts of water. This solution is warmed to 65° C., whereupon addition of a solution of 20 parts of sodium bicarbonate in 190 parts of water is begun. When ⅓ of the latter solution is added, the support material is dumped into the stirring solution. The support consists of an intimate physical mixture of 50 parts of "eta" alumina and 0.75 part of sodium methoxide. The remaining sodium bicarbonate solution is added over a period of about 4 minutes. The resulting slurry is digested for one hour at 65–70° C., filtered and washed with 1200 parts of sodium bicarbonate solution in water. The product is given an additional wash with 800 parts of a 5% sodium hydroxide solution in water, then sucked dry. The air-dried cake is further dried at 150° C. then activated prior to use at 170–200° C. in a stream consisting of 95% nitrogen, 5% hydrogen.

The above catalyst contains about 1.6% sodium, by weight. Ten parts of the catalyst is mixed with 500 parts of o-toluidine and 50 parts of ammonia, and is then subjected to hydrogenation at a hydrogen pressure of 2000 p.s.i. and a temperature of 200° C. until hydrogen uptake ceases. Distillation of the product shows a 98.0% yield of 2-methylcyclohexylamine based on o-toluidine.

EXAMPLE 43

At a temperature of 220° C. and a total pressure of 4500 p.s.i.g. in a suitable pressure vessel, 100 parts of m-phenylenediamine, 100 parts of dioxane, and 25 parts of ammonia are subject to hydrogenation utilizing 10 parts of the finely divided catalyst of Example 42. The hydrogenated mixture is freed of catalyst by filtration and distilled to strip off solvent. Final distillation under vacuum gives 1,3-diaminocyclohexane in an amount equal to a yield of 95.5% based on the amount of aromatic compound introduced into the process.

The following compounds are hydrogenated in good yield according to the procedure of Example 43 by substituting for the m-phenylenediamine an equivalent amount of the amines set forth in the following list:

N-isopropylaniline
N-ethyl-N-methylaniline
N-ethyl-1-naphthylamine
N-ethyl-o-toluidine
N-decyl-1-naphthylamine
N-ethyl-m-toluidine
N-ethyl-N-benzyl-m-toluidine
N-phenylbenzylamine
N-phenyl-1-naphthylamine
N-phenyl-p-phenylenediamine
N,N,N',N'-tetramethylbenzidine
4-methoxy-o-phenylenediamine
1,5-diaminonaphthalene
2,6-diaminopyridine
p-xylylenediamine
N,N-dimethylaniline
4,4'-methylenebis(N,N-dimethylaniline)
2,7-diaminofluorene
bis(3,4-diaminophenyl)methane
bis(4-amino-3-methylphenyl)methane
4,4'-methylenedi(1-naphthylamine)
4,4'-methylenedi(m-anisidine)
4,4'-methylene-bis(N-ethyl-o-toluidine)
o-phenylenediamine
p-phenylenediamine
p-(dimethylamino)benzylamine
benzidine.

EXAMPLE 44

At a temperature of 225° C. and a hydrogen pressure of 4500 p.s.i.g. in a suitable pressure vessel, 100 parts of o-toluidine, 100 parts of dioxane and 2 parts of sodium methoxide are subjected to hydrogenation utilizing 10 parts of a finely divided catalyst comprising 5% ruthenium on alumina. The hydrogenated mixture is freed of catalyst by filtration and distilled to strip off solvent. Final distillation under vacuum gives 2-methylcyclohexylamine in a 98% yield based on o-toluidine.

The following compounds are hydrogenated in good yields according to the procedure of Example 44 by substituting for the o-toluidine and dioxane an equivalent amount of the specified amine and solvent as set forth in the following table:

| Amine: | Solvent |
| --- | --- |
| m-Phenylenediamine | Dioxane. |
| 2,4-diaminotoluene | Dioxane. |
| 2-methoxy-5-methylaniline | Methanol. |
| p-Xylylenediamine | Butyl ether. |
| 2-aminopyridine | Methanol. |
| 3,3'-dimethylbenzidine | Dioxane. |
| 1-aminoanthracene | Dioxane. |
| 5-aminoquinoline | Butyl ether. |
| 2-amino-4-picoline | n-Hexane. |
| 5-aminoindole | Cyclohexane. |
| 2-aminofluorene | Dioxane. |
| 4,4'-ethylenedianiline | Dioxane. |
| 4,4'-methylenedi(1-naphthylamine) | Dioxane. |
| 4,4'-methylenedianiline | Dioxane. |
| Aniline | Butyl ether. |
| o-Anisidine | Butyl ether. |
| m-Toluidine | Dioxane. |
| p-Toluidine | Dioxane. |
| Benzidine | Dioxane. |

EXAMPLE 45

At a temperature of 225° C. and a hydrogen pressure of 4500 p.s.i.g. in a suitable pressure vessel, 150 parts of 2,4-bis(4-aminobenzyl)aniline and 150 parts dioxane are subjected to hydrogenation utilizing 20 parts of a finely divided catalyst comprising 5% ruthenium on alumina and 3 parts sodium methoxide for a period of 50 minutes. The resulting mixture is freed of catalyst by filtration and distillation under vacuum gives 2,4-bis(4-aminocyclohexylmethyl)cyclohexylamine.

EXAMPLE 46

At a temperature of 225° C. and a hydrogen pressure of 4500 p.s.i.g. in a suitable pressure vessel, 150 parts of benzylamine and 150 parts dioxane are subjected to hydrogenation utilizing 10 parts of a finely divided catalyst comprising 5% ruthenium on alumina and 2 parts sodium methoxide for a period of 30 minutes. The resulting mixture is freed of catalyst by filtration and distillation under vacuum gives hexahydrobenzylamine in high yield.

EXAMPLE 47

At a temperature of 225° C. and a hydrogen pressure of 4500 p.s.i.g. in an agitated pressure vessel, 150 parts of p-toluidine and 50 parts dioxane are subjected to hydrogenation utilizing 20 parts of a finely divided catalyst comprising 0.5% ruthenium on alumina and 0.5 part sodium methoxide. The resulting mixture is freed of catalyst by filtration and distillation under vacuum gives a good yield of 4-methylcyclohexylamine.

EXAMPLE 48

At a temperature of 225° C. and a hydrogen pressure of 4500 p.s.i.g. in an agitated pressure vessel, 150 parts of aniline and 50 parts dioxane are subjected to hydrogenation utilizing 10 parts of a finely divided catalyst comprising 9% ruthenium on alumina and 1.5 parts sodium methoxide. The resulting mixture is freed of catalyst by filtration. Distillation gives a good yield of cyclohexylamine.

I claim:

1. A process for hydrogenating to the corresponding saturated compound an aromatic nitrogen-containing compound represented by the following formulae:

(I) 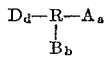

(II) 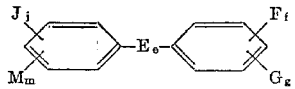

(III) 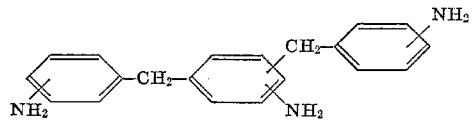

and (IV) 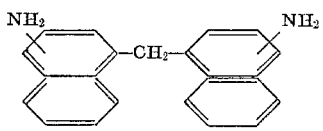

wherein:

R is benzene, naphthalene, anthracene, or fluorene;
A is

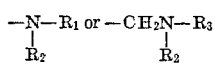

B is —$NH_2$, alkyl having 1 to 12 carbon atoms, or alkoxy having 1 to 5 carbon atoms;
D is alkyl having 1 to 12 carbon atoms, —$NH_2$, alkoxy having 1 to 5 carbon atoms, or —OH;
E is —$CH_2$—, —$CH_2CH_2$—, or —O—;
F is

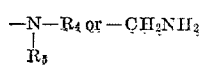

G is —$NH_2$ or alkyl having 1 to 12 carbon atoms;
J is

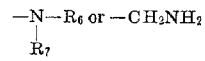

M is —$NH_2$ or alkyl having 1 to 12 carbon atoms;
$R_1$ is hydrogen or alkyl having 1 to 12 carbon atoms;
$R_2$ is hydrogen, alkyl having 1 to 12 carbon atoms, benzyl, cyclohexyl, or phenyl;
$R_3$ is hydrogen or alkyl having 1 to 12 carbon atoms;
$R_4$, $R_5$, $R_6$ and $R_7$ are the same or different and are selected from hydrogen or alkyl having 1 to 12 carbon atoms;
$a$ is an integer selected from 1 or 2, with the proviso that when $a$ is 2, the A groups may be the same or different; and
$b$, $d$, $e$, $f$, $g$, $j$, and $m$ are the same or different and are integers selected from 0 or 1 with the provisio that at least one of $f$, $g$, $j$ or $m$ is 1;

with the provisos that:
(1) compounds having Formula I can contain no more than 30 carbon atoms and
(2) compounds having Formula II can contain no more than 36 carbon atoms;

comprising admixing said compound with hydrogen at a hydrogen partial pressure of at least 200 p.s.i., a total pressure of from 200 p.s.i. to 15,000 p.s.i., a temperature in the range of from 100° C. to 300° C., in the presence of from 0% to 200%, based on the weight of said compound to be hydrogenated, of added ammonia, and in the presence of from 0.001% to 10% by weight, based on said compound to be hydrogenated and calculated as metallic ruthenium, of a ruthenium catalyst supported on an inert carrier, said catalyst being alkali moderated with from 0.1% to 15% of a basic metal compound calculated as the alkali metal.

2. The process of claim 1 wherein said compound is o, m, or p-phenylenediamine.

3. The process of claim 1 wherein said compound is o, m, or p-toluidine.

4. The process of claim 1 wherein the inert carrier is selected from the group consisting of alumina, barium sulfate, kieselguhr, carbon, calcium carbonate, rare earth carbonates, rare earth oxides and mixed rare earth oxide-carbonates.

5. The process of claim 1 in which the basic alkali metal compound is selected from the group consisting of (1) the hydroxides, carbonates, bicarbonates, and alkoxides of sodium, potassium and lithium, and (2) sodamide.

6. The process of claim 1 in which the catalyst is ruthenium on alumina.

7. The process of claim 1 wherein the catalyst is alkali moderated with from 0.5 to 10% of the alkali metal compound calculated as the alkali metal.

8. The process of claim 1 in which the basic alkali metal compound is selected from the group consisting of sodium carbonate, sodium hydroxide, sodium methoxide and potassium hydroxide.

9. The process of claim 1 wherein said compound is represented by the following formulae:

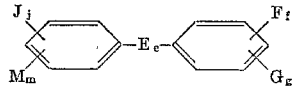

and

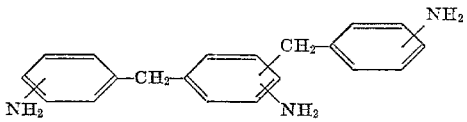

10. The process of claim 9 wherein the inert carrier is selected from the group consisting of alumina, barium sulfate, kieselguhr, carbon, calcium carbonate, rare earth carbonates, rare earth oxides and mixed rare earth oxide-carbonates.

11. The process of claim 9 in which the basic alkali metal compound is selected from the group consisting of (1) the hydroxides, carbonates, bicarbonates, and alkoxides of sodium, potassium and lithium, and (2) sodamide.

12. The process of claim 9 in which the catalyst is ruthenium on alumina.

13. The process of claim 9 wherein the catalyst is alkali moderated with from 0.5 to 10% of the alkali metal compound calculated as the alkali metal.

14. The process of claim 9 in which the basic alkali metal compound is selected from the group consisting of sodium carbonate, sodium hydroxide, sodium methoxide and potassium hydroxide.

15. The process of claim 9 wherein said compound is benzidine.

16. The process of claim 9 wherein said compound is 2,4-bis(4-aminobenzyl)aniline.

17. The process of claim 9 wherein said compound is 4,4'-methylenedianiline.

18. The process of claim 17 wherein the inert carrier is selected from the group consisting of alumina, barium sulfate, kieselguhr, carbon, calcium carbonate, rare earth carbonates, rare earth oxides and mixed rare earth oxide-carbonates.

19. The process of claim 17 in which the basic alkali metal compound is selected from the group consisting of (1) the hydroxides, carbonates, bicarbonates, and alkoxides of sodium, potassium and lithium, and (2) sodamide.

20. The process of claim 17 in which the catalyst is ruthenium on alumina.

21. The process of claim 17 wherein the catalyst is alkali moderated with from 0.5 to 10% of the alkali metal compound calculated as the alkali metal.

22. The process of claim 17 in which the basic alkali metal compound is selected from the group consisting of sodium carbonate, sodium hydroxide, sodium methoxide and potassium hydroxide.

References Cited

UNITED STATES PATENTS

| 2,606,925 | 1952 | Whitman | 260—563 |
| 2,606,926 | 1952 | Kirby | 260—563 |
| 2,606,928 | 1952 | Barkdoll et al. | 260—563 |
| 2,822,392 | 1958 | Illich et al. | 260—563 |
| 2,930,765 | 1960 | Cooper et al. | 252—473 |
| 2,930,766 | 1960 | Lacey | 252—473 |
| 3,155,724 | 1964 | Arthur | 260—563 |
| 3,193,584 | 1965 | Rylander et al. | 260—611 |
| 3,347,915 | 1967 | Arthur | 260—563 |

CHARLES B. PARKER, Primary Examiner

D. R. PHILLIPS, Assistant Examiner

U.S. Cl. X.R.

260—283 R, 288 R, 293.2, 319.1, 326.15

PO-1050
(5/69)

UNITED STATES PATENT OFFICE
CERTIFICATE OF CORRECTION

Patent No. 3,636,108      Dated January 18, 1972

Inventor(s) Loren D. Brake

It is certified that error appears in the above-identified patent and that said Letters Patent are hereby corrected as shown below:

Column 3, lines 59-60; Column 4, lines 59-60; Column 7, lines 51-52; and Column 20, lines 18-19, the phrase "with the proviso that at least one of f, g, j or m is 1" should read --with the proviso that at least one of f or j is 1--.

Column 4, line 38, the period at the end of the sentence should be changed to a comma, and the following phrase added: --with the proviso that at least one of f or j is 1--.

Signed and sealed this 3rd day of July 1973.

(SEAL)
Attest:

EDWARD M. FLETCHER, JR.      Rene Tegtmeyer
Attesting Officer      Acting Commissioner of Patents